United States Patent
Wang et al.

(10) Patent No.: US 11,366,629 B2
(45) Date of Patent: Jun. 21, 2022

(54) PRESENTATION SERVER, DATA RELAY METHOD AND METHOD FOR GENERATING VIRTUAL POINTER

(71) Applicant: BARCO N.V., Kortrijk (BE)

(72) Inventors: Hsing Yung Wang, Taoyuan (TW); Po-Yuan Yu, New Taipei (TW); Way Lu-Chen, New Taipei (TW); Sheng-Yu Sun, New Taipei (TW); JR-Rong Fan, New Taipei (TW); Hsing-Yu Chen, New Taipei (TW)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 16/609,627

(22) PCT Filed: May 2, 2018

(86) PCT No.: PCT/EP2018/061228
§ 371 (c)(1),
(2) Date: Oct. 30, 2019

(87) PCT Pub. No.: WO2018/202728
PCT Pub. Date: Nov. 8, 2018

(65) Prior Publication Data
US 2020/0065053 A1      Feb. 27, 2020

(30) Foreign Application Priority Data
May 2, 2017   (TW) .................. 106114456

(51) Int. Cl.
*G06F 3/14*   (2006.01)
*G09G 5/14*   (2006.01)
*G06F 3/0354* (2013.01)

(52) U.S. Cl.
CPC ............. *G06F 3/1454* (2013.01); *G09G 5/14* (2013.01); *G06F 3/0354* (2013.01);
(Continued)

(58) Field of Classification Search
CPC .... G06F 3/1454; G06F 3/0354; G06F 3/1423; G09G 5/14; G09G 2340/12;
(Continued)

(56) References Cited

U.S. PATENT DOCUMENTS 9,652,824 B2 *  5/2017  Masuoka ................ G06F 3/038
9,740,507 B2 *  8/2017  Pinto ....................... G06F 9/452
(Continued)

FOREIGN PATENT DOCUMENTS

CN   101488867 A   7/2009
TW   201628403 A   8/2016
(Continued)

OTHER PUBLICATIONS

International Search Report in corresponding PCT/EP2018/061228, dated Jul. 4, 2018.
(Continued)

*Primary Examiner* — Bryan Earles
(74) *Attorney, Agent, or Firm* — Hamre, Schumann, Mueller & Larson, P.C.

(57) ABSTRACT

A presentation server establishes a network connection with a presentation device and a client device. The presentation server is able to receive frame data transmitted by the presentation device and pointer coordinates transmitted by the client device. Therefore, the presentation server is able to display a virtual pointer on the presentation frame according to the pointer coordinates, so that the participant can operate the pointing device of the client device to control the virtual pointer so as to participate effectively in the presentation and interact with the speaker.

20 Claims, 7 Drawing Sheets

(52) U.S. Cl.
CPC ... *G09G 2340/12* (2013.01); *G09G 2370/022* (2013.01); *G09G 2370/16* (2013.01)

(58) Field of Classification Search
CPC ......... G09G 2370/022; G09G 2370/16; G09G 2340/14; G09G 2370/12; G09G 2370/24; G09G 5/006
See application file for complete search history.

(56) References Cited

U.S. PATENT DOCUMENTS

| | | | |
|---|---|---|---|
| 10,976,984 B2* | 4/2021 | Feldman | H04N 7/147 |
| 2010/0138780 A1* | 6/2010 | Marano | G06F 3/147 |
| | | | 715/804 |
| 2011/0113148 A1 | 5/2011 | Salmela et al. | |
| 2013/0201214 A1 | 8/2013 | Piippo et al. | |
| 2016/0323328 A1* | 11/2016 | Riecken | G06Q 10/101 |
| 2016/0371048 A1* | 12/2016 | Morris | G06F 40/166 |

FOREIGN PATENT DOCUMENTS

| | | |
|---|---|---|
| WO | 2009143294 A2 | 11/2009 |
| WO | 2011077859 A1 | 6/2011 |
| WO | 2012164155 A1 | 12/2012 |

OTHER PUBLICATIONS

Written Opinion in corresponding PCT/EP2018/061228, dated Jul. 4, 2018.
TW Office Action in corresponding TW Application No. 106119074, dated Jan. 17, 2018.
International Preliminary Report on Patentability in corresponding PCT Application No. PCT/EP2018/061228, dated Nov. 14, 2019.
Communication issued in European Application No. 18724793.7, dated Oct. 8, 2021, 12 pages provided.

\* cited by examiner

PRESENTATION SERVER, DATA RELAY METHOD AND METHOD FOR GENERATING VIRTUAL POINTER

BACKGROUND OF THE INVENTION

1. Field of the Invention

The present invention relates to a presentation system, particularly to a presentation system able to generate a virtual pointer.

2. Description of the Prior Art

The conventional presentation system retrieves the frame picture from a computer playing the frame of a presentation and transmits the retrieved frame picture to a display device, such as a projector or a television, for presenting the extracted frame picture, whereby the audience can view the contents of the presentation. During a presentation, the speaker uses a laser pointer to project a light spot onto a projection screen or uses a mouse to control a mouse pointer, whereby to guide the audience to view the contents of the presentation. However, a participant is less likely to carry a laser pointer to a presentation and thus hard to interact with the speaker.

Accordingly, it becomes a target of the related manufacturers that the participants of a presentation can point out a specified position in the contents of a presentation to interact with the speaker.

SUMMARY OF THE INVENTION

The present invention provides a presentation server, a data relay method and a method for generating a virtual pointer, whereby to generate a virtual pointer on the contents of a presentation, whereby a participant can use a pointing device (such as a mouse) of a client device to control the virtual pointer and interact with the speaker.

In one embodiment of the present invention, the presentation server comprises a network interface, a video connection port and a processor. The video connection port is electrically connected with a display device. The processor is electrically connected with the network interface and the video connection port and undertakes a data processing method to display a presentation frame on the display device. The data processing method comprises: respectively establishing network connections with a presentation device and a client device through the network interface; receiving first frame data transmitted by the presentation device; converting the first frame data into a presentation frame and displaying the presentation frame on the display device; transmitting the presentation frame to the client device; receiving pointer coordinates transmitted by the client server; and displaying a virtual pointer on the presentation frame according to the pointer coordinates.

In another embodiment of the present invention, the data relay method is executed by a relay server for transmitting frame data and pointer coordinates. The data relay method comprises: establishing network connections with a plurality of presentation servers, wherein each presentation server has network connections with at least one presentation device or at least one client device, and wherein the presentation device transmits frame data to the presentation server or the client device transmits pointer coordinates to the presentation server; receiving frame data and pointer coordinates transmitted by each presentation server; converting the frame data into a presentation frame; and transmitting the presentation frame and the pointer coordinates to each presentation server.

In a further embodiment of the present invention, the method for generating a virtual pointer is realized with a computer program in a client device. The method for generating a virtual pointer comprises: establishing a network connection between the client device and a presentation server or a relay server, wherein the presentation server or the relay server has network connections with at least one presentation device, and wherein the presentation device transmits frame data to the presentation server or the relay server for converting the frame data into a presentation frame; receiving the presentation frame transmitted by the presentation server or the relay server, and displaying the presentation frame on a display device of the client device; retrieving pointer coordinates the user inputs into the client server; and transmitting the pointer coordinates to the presentation server or the relay server to enable the presentation server or the relay server to display a virtual pointer on the presentation frame according to the pointer coordinates.

Below, embodiments are described in detail in cooperation with the attached drawings to make easily understood the objectives, technical contents, characteristics and accomplishments of the present invention.

DETAILED DESCRIPTION OF THE INVENTION

Figure 1:
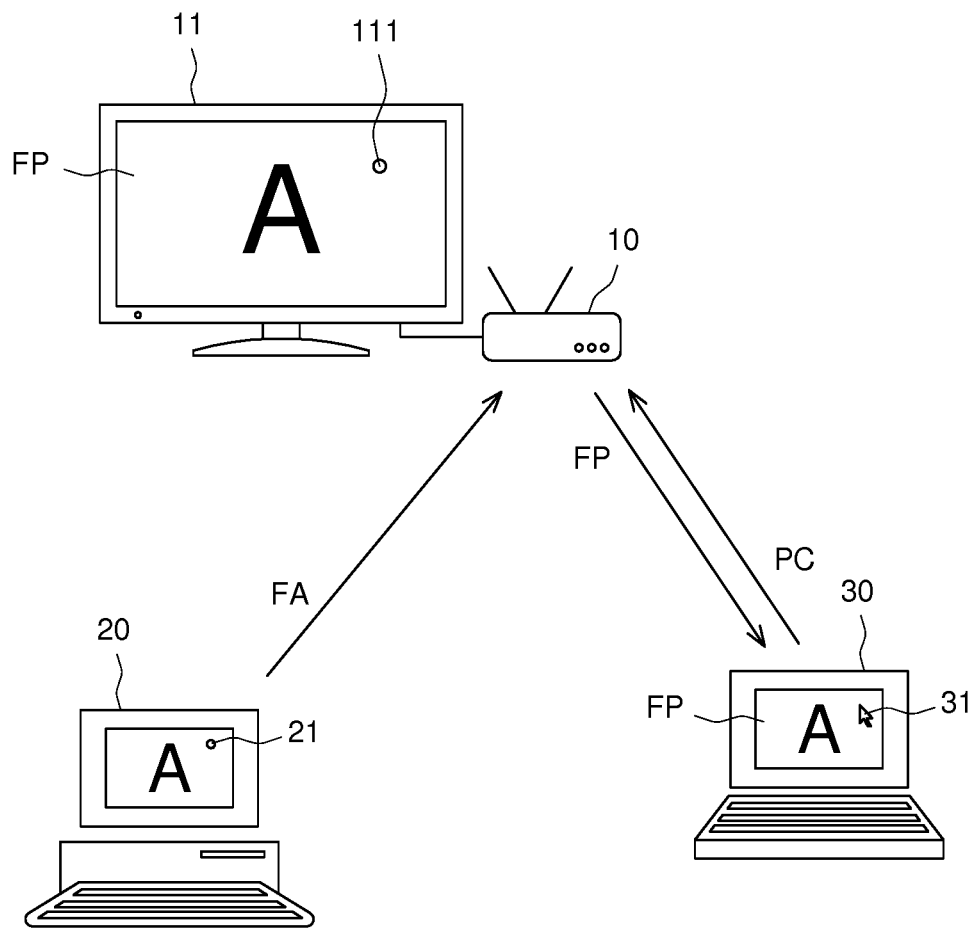
FIG. 1 is a diagram schematically showing a first presentation system realized by a presentation server according to one embodiment of the present invention.
Figure 2:
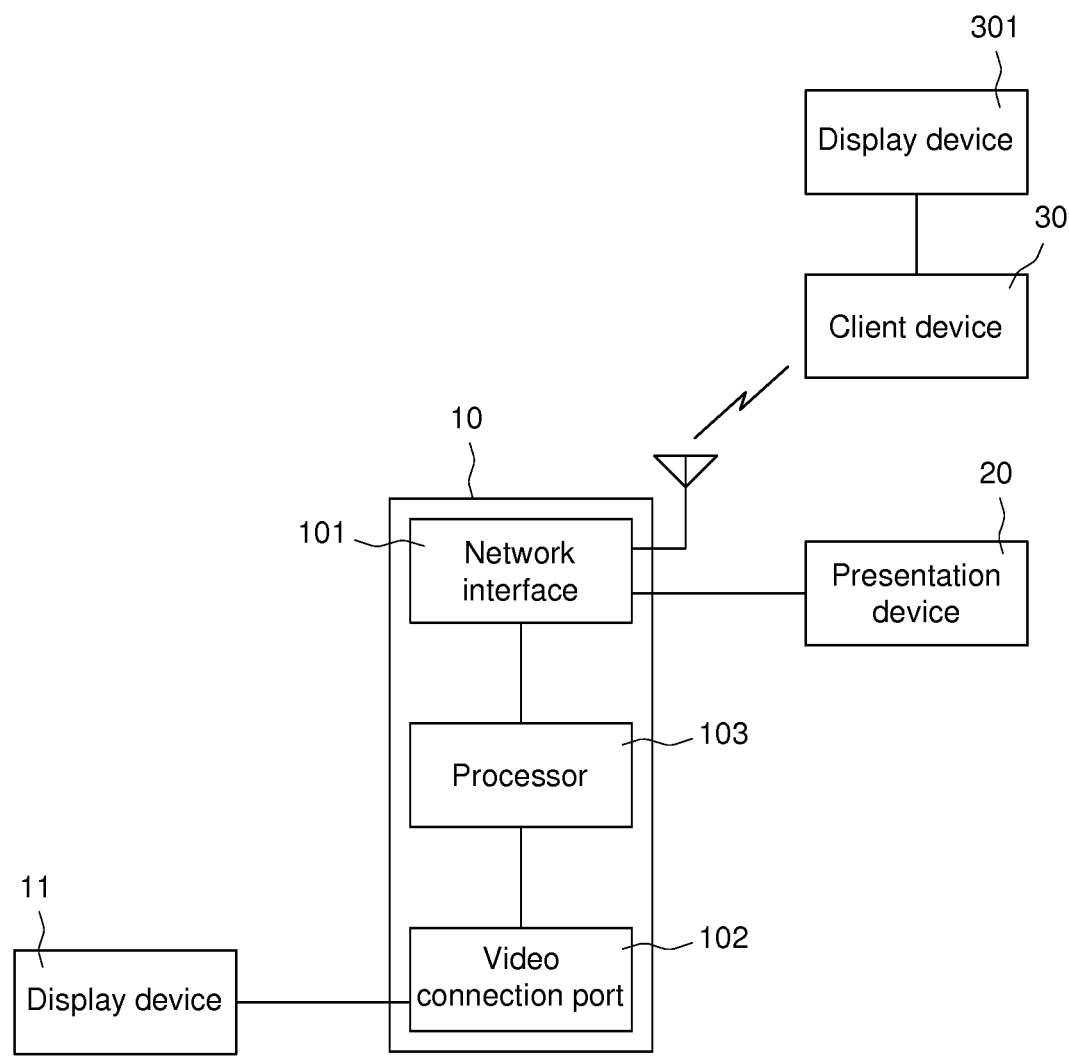
FIG. 2 is a block diagram schematically showing a presentation server according to one embodiment of the present invention.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Refer to FIG. 1. In one embodiment of the present invention, the presentation system comprises a presentation server 10, a presentation device 20 and a client device 30. The presentation server is also called the presentation base unit, which functions like a set-top box (STB) of a digital TV. Generally, a presentation server receives external signal sources to display the contents of the external signal sources on a display device except the frames for turning-on, turning-off, setting, etc. The presentation server 10 includes a network interface 101, a video connection port 102 and a processor 103. The processor 103 is electrically connected with the network interface 101 and the video connection port 102. The presentation server 10 is electrically connected with a display device 11 through the video connection port 102. The video connection port 102 may be a video graphic array (VGA) connection port, a digital visual interface (DVI), or a high definition multimedia interface (HDMI). The network interface 101 is a wired network interface or a wireless network interface. It is preferred: the network interface 101 acts according to the IEEE801.11 wireless communication standard. It should be noted: the network interface 101 may be an assembly of a plurality of network interfaces. For example, the presentation server 10 establishes a network connection with the presentation device 20 through a wired network interface and establishes a network connection with the client device 30 through a wireless network interface. However, the present invention is not limited by the abovementioned example. In one embodiment, the presentation server 10 establishes a network connection with the presentation device 20 through a wireless network interface and establishes a network connection with the client device 30 through a wired network interface. In other words, the presentation server 10 may select a wired network interface or a wireless network interface to establish network connections with the presentation device 20 and the client device 30 according to the scenarios. The processor 103 can execute a data processing method to display a presentation frame on the display device 11. In one embodiment, the data processing method is realized with computer software, wherein the computer software is loaded into the processor 103 to execute specified procedures and realize the data processing method.

Figure 3:
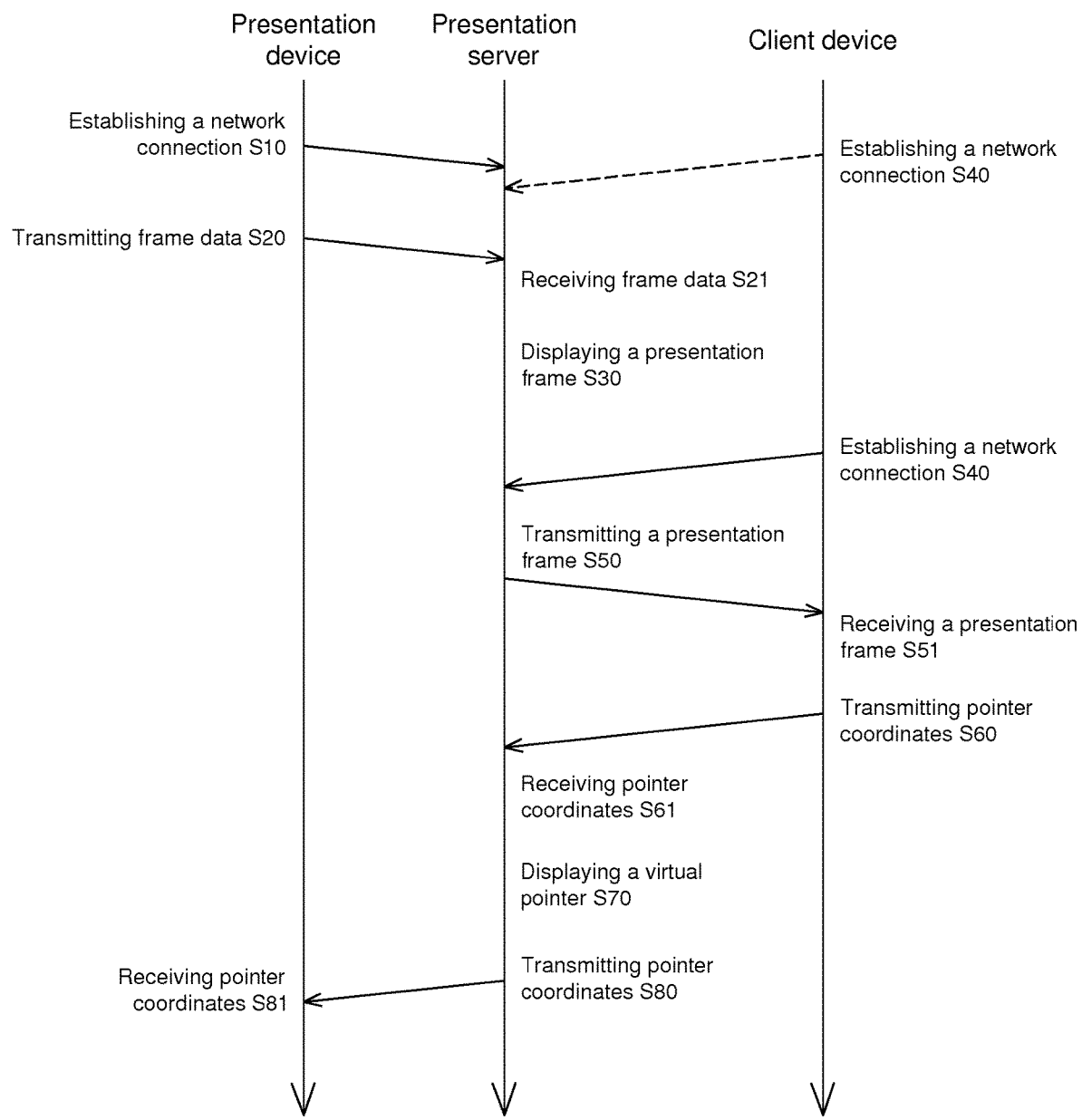
FIG. 3 is a diagram schematically showing a data processing method executed by a presentation server according to one embodiment of the present invention.

Refer to FIG. 1 and FIG. 3. Below is described the data processing method executed by the processor 103 of the presentation server 10. The data processing method comprises Steps S10-S80. In Step S10, the presentation device 20 establishes a network connection with the presentation server 10. In Step S20, the presentation device 20 transmits the frame data FA of the presentation to the presentation server 10. For example, the operating system of the presentation device 20 uses a program to acquire a lossless frame picture, which is displayed by the presentation device 20 and also called the screenshot, to function as the frame data FA. Alternatively, the operating system of the presentation device 20 retrieves a single window frame, which executes specified software (such as presentation software), to function as the frame data FA. Thus, the frame data FA acquired by the presentation device 20 is completely identical to the corresponding frame of the display device 11, i.e. information of the frame data is lossless. In Step S21, the presentation server 10 receives the frame data FA transmitted by the presentation device 20. In Step S30, the presentation server 10 uses the frame data FA as the presentation frame FP and displays the presentation frame FP on the display device 11 electrically connected with the presentation server 10. It should be explained herein: in order to match the resolution or display position of the display device 11, the presentation server 20 can convert the frame data FA into an appropriate presentation frame FP. Therefore, the frame data FA and the presentation frame FP may be identical or different. Then, the speaker undertakes the presentation in the conventional way. For example, the speaker projects a light spot onto the display device or controls a mouse pointer to guide the audience to view the contents of the presentation.

In Step S40, a participant operates the client device 30 to establish a network connection with the presentation server 10 if he intends to participate the presentation or interact with the speaker. It is easily understood: the client device 30 may establish a network connection with the presentation server 10 in advance, as shown by the dashed line. In Step S50, the presentation server 10 transmits the presentation frame FP to the client device 30. In one embodiment, the client device 30 receives the presentation frame FP (Step S51) and uses a built-in display device 301 or an external display device 301 to display the presentation frame FP transmitted by the presentation server 10. Then, the participant operates the pointing device of the client device 30 to control the relative position of the pointer 31 in the presentation frame FP. In Step S60, the client device 30 transmits pointer coordinates PC to the presentation server 10. For example, the pointing device may be a mouse, a trackball, a touchpad, a pointing stick, or a touch panel. It is easily understood: displaying the presentation frame FP on the built-in display device 301 or the external display device 301 is favorable for the user to control the position of the pointer 31 in the presentation frame FP. In Step S61, the presentation server 10 receives the pointer coordinates PC transmitted by the client device 30. In Step S70, the presentation server 10 displays a virtual pointer 111 on the presentation frame FP displayed by the display device 11 according to the pointer coordinates PC. Thus, the participant can interact with the speaker via controlling the virtual pointer 111. In one embodiment, the presentation server 10 displays the virtual pointer 111 on the presentation frame FP in an on-screen display (OSD) method or an overlay window method. It is easily understood: as the virtual pointer 111 is corresponding to the pointer 31 of the client device 30, the client device 30 does not necessarily display the virtual pointer 111.

In one embodiment, the data processing method further comprises a step of selectively hiding the virtual pointer 111 on the presentation frame FP, i.e. not displaying the virtual pointer 111 on the presentation frame FP. For example, while the presentation server 10 does not receive pointer coordinates PC, a timer is triggered; while the counted time exceeds a preset value, the presentation server 10 hides the virtual pointer 111. Alternatively, the speaker uses the presentation device 20 to output a control instruction to the presentation server 10 to make the presentation server 10 hide the virtual pointer 111 temporarily.

In one embodiment, the data processing method further comprises a step of displaying the track of the movement of the virtual pointer 111 according to the pointer coordinates PC, whereby to implement the function of annotation or hand drawing. For example, while transmitting the pointer coordinates PC, the client device 30 can simultaneously transmit the operating state of the pointing device, such as the button-pressed state and the button-released state. The presentation server 10 can realizes the function of annotation or hand drawing according to the pointer coordinates PC and the operating state of the pointing device. For example, while the user moves the virtual pointer 111 in the button-pressed state, the presentation server 10 enlarges the virtual pointer 111 and draws the movement track of the virtual pointer 111 on the presentation frame FP; while the user releases the button, the virtual pointer 111 is restored to the preset size, and the track of the moving virtual pointer 111 is not drawn on the presentation frame FP. It is easily understood: a touch panel may have the operating states of pressing the button and releasing the button via setting the touch panel appropriately. For example, a single finger touch, a multiple finger touch, and no touch may be used to represent different operating states.

In one embodiment, the data processing method comprises a step of transmitting the pointer coordinates PC to the presentation device 20 (Step S80). After the presentation device 20 receives the pointer coordinates PC (Step S81), the presentation device 20 displays a virtual pointer 21 on a display device of the presentation device 20 according to the pointer coordinates PC. In such a design, the speaker can view the display device of the presentation device 20 to interact with the participant controlling the virtual pointer 21. In one embodiment, the presentation device 20 transmits frame data FA containing the virtual pointer 21 to the presentation server 10, whereby less system resource of the presentation server 10 is spent in processing the virtual pointer 111.

Figure 4:
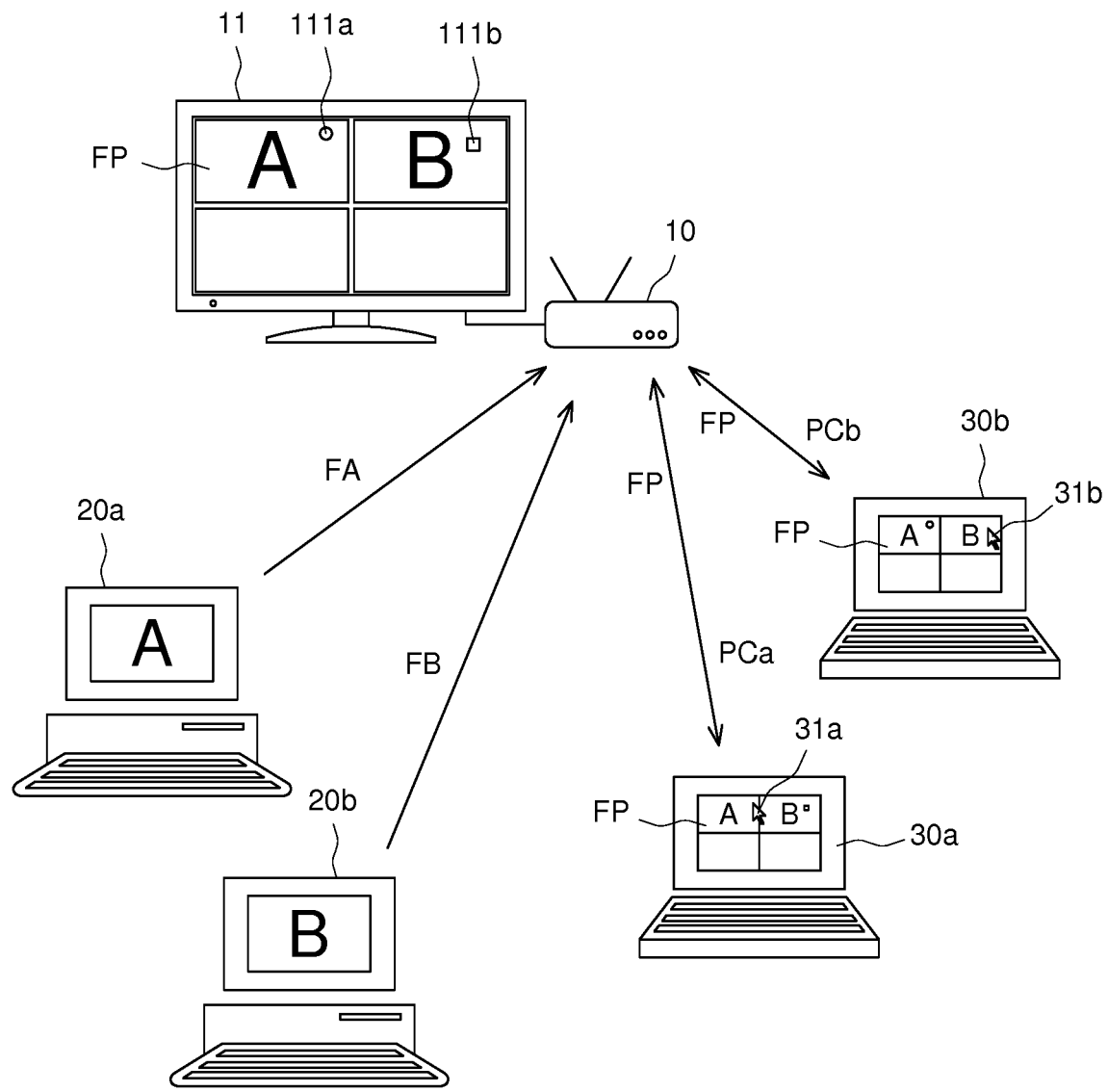
FIG. 4 is a diagram schematically showing a second presentation system realized by a presentation server according to one embodiment of the present invention.

Refer to FIG. 4. In one embodiment, the presentation server 10 establishes network connections with a plurality of presentation devices 20*a* and 20*b* and receives the frame data FA and FB respectively transmitted by the presentation devices 20*a* and 20*b*. The presentation server 10 can convert the plurality of frame data FA and FB into the presentation frame FP and display the presentation frame FP on the display device 11. In one embodiment, the presentation server 10 can simultaneously display the frame data FA and FB transmitted by different presentation devices 20*a* and 20*b* in a four grid screen, as shown in FIG. 4. However, the present invention is not limited by the abovementioned embodiment. In other embodiments, the presentation server 10 displays the frame data FA and FB transmitted by different presentation devices 20*a* and 20*b* in a two grid screen, a nine grid screen, or a screen having grids of different sizes. For example, the contents of a presentation being discussed is displayed in a larger grid, and the contents of a presentation not discussed now is display in a smaller grid.

Refer to FIG. 4 again. In one embodiment, the presentation server 10 establishes network connections with a plurality of client devices 30*a* and 30*b* and receives a plurality of sets of pointer coordinates PCa and PCb transmitted by the plurality of client device 30*a* and 30*b*. The presentation server 10 displays a plurality of corresponding virtual pointer 111*a* and 111*b* on the presentation frame FP according to different sets of pointer coordinates PCa and PCb. The users of the client devices 30*a* and 30*b* control the positions of the virtual pointers 111*a* and 111*b* via controlling the pointers 31*a* and 31*b*. In one embodiment, different virtual pointers 111*a* and 111*b* respectively have different features for recognizing different users. For example, different virtual pointers 111*a* and 111*b* can be distinguished according to different shapes, different colors, or notations of different texts. In FIG. 4, the virtual pointer 111*a* is in form of a circle, and the virtual pointer 111*b* is in form of a square.

Figure 5:
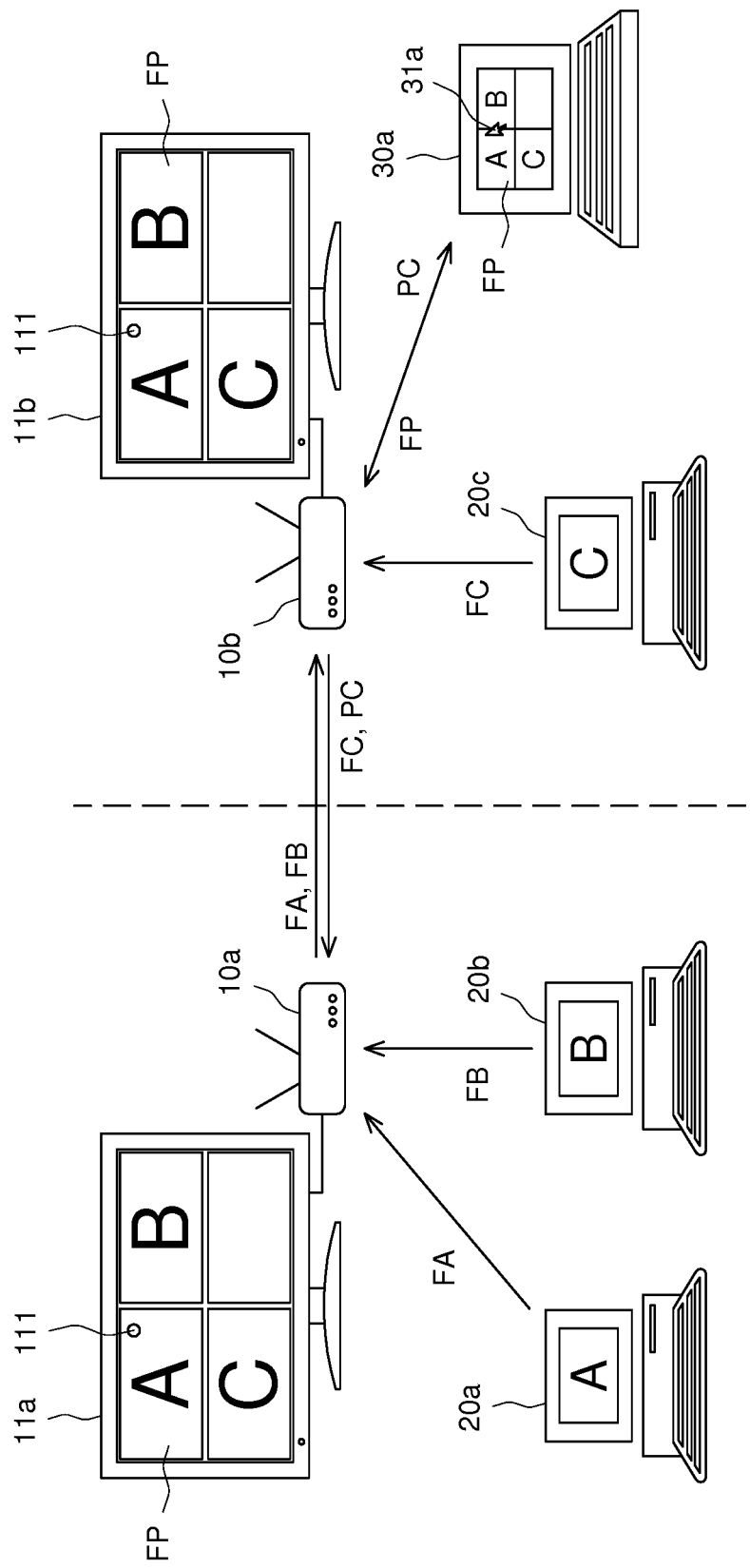
FIG. 5 is a diagram schematically showing a third presentation system realized by a presentation server according to one embodiment of the present invention.

Refer to FIG. 5. In one embodiment, a presentation server 10*a* can establish a network connection with another presentation server 10*b*, whereby to synchronize the frame data they receive and display an identical presentation frame. To achieve the abovementioned objective, the data processing method further comprises a step: establishing a network connection between the presentation server 10*a* and the presentation server 10*b*. The presentation server 10*a* establishes network connections with presentation devices 20*a* and 20*b* and receives the frame data FA and FB transmitted by the presentation devices 20*a* and 20*b*. The presentation server 10*b* establishes a network connection with a presentation device 20*c* and receives the frame data FC transmitted by the presentation device 20*c*. For discrimination, the frame data FA and FB is called first frame data, and the frame data FC is called second frame data. The presentation server 10*a* receives the frame data FC transmitted by the presentation server 10*b*. The presentation server 10*b* receives the frame data FA and FB transmitted by the presentation server 10*a*. The presentation servers 10*a* and 10*b* respectively convert the received frame data FA, FB, and FC into the presentation frame FP. Then, the presentation frame FP is displayed on the display devices 11*a* and 11*b* respectively electrically connected with the presentation servers 10*a* and 10*b*. It is easily understood: the presentation servers 10*a* and 10*b* can be respectively disposed in different conference rooms or class rooms. For example, the presentation servers 10*a* and 10*b* can be respectively disposed at two sides of the dashed line in FIG. 5. Thereby, the audiences in different conference rooms or class rooms can discuss the same presentation contents.

Refer to FIG. 5 again. It is easily understood: once any one of the presentation servers 10*a* and 10*b* receives the pointer coordinates PC transmitted by the client device, it will transmit the pointer coordinates PC to the other presentation servers. Thereby, all the display devices 11*a* and 11*b* in different conference rooms or different class rooms can display the virtual pointer 111. For example, the client device 30 establishes a network connection with the presentation server 10*b*. Therefore, the presentation server 10*b* will transmit the presentation frame FP to the client device 30, and the client device 30 will transmit the pointer coordinates PC to the presentation server 10*b*. In such a case, the presentation server 10*b* will transmit the pointer coordinates PC to the presentation server 10*a*. Thus, all the display devices 11*a* and 11*b*, which are respectively electrically connected with the presentation servers 10*a* and 10*b*, can display the virtual pointer 111.

Figure 6:
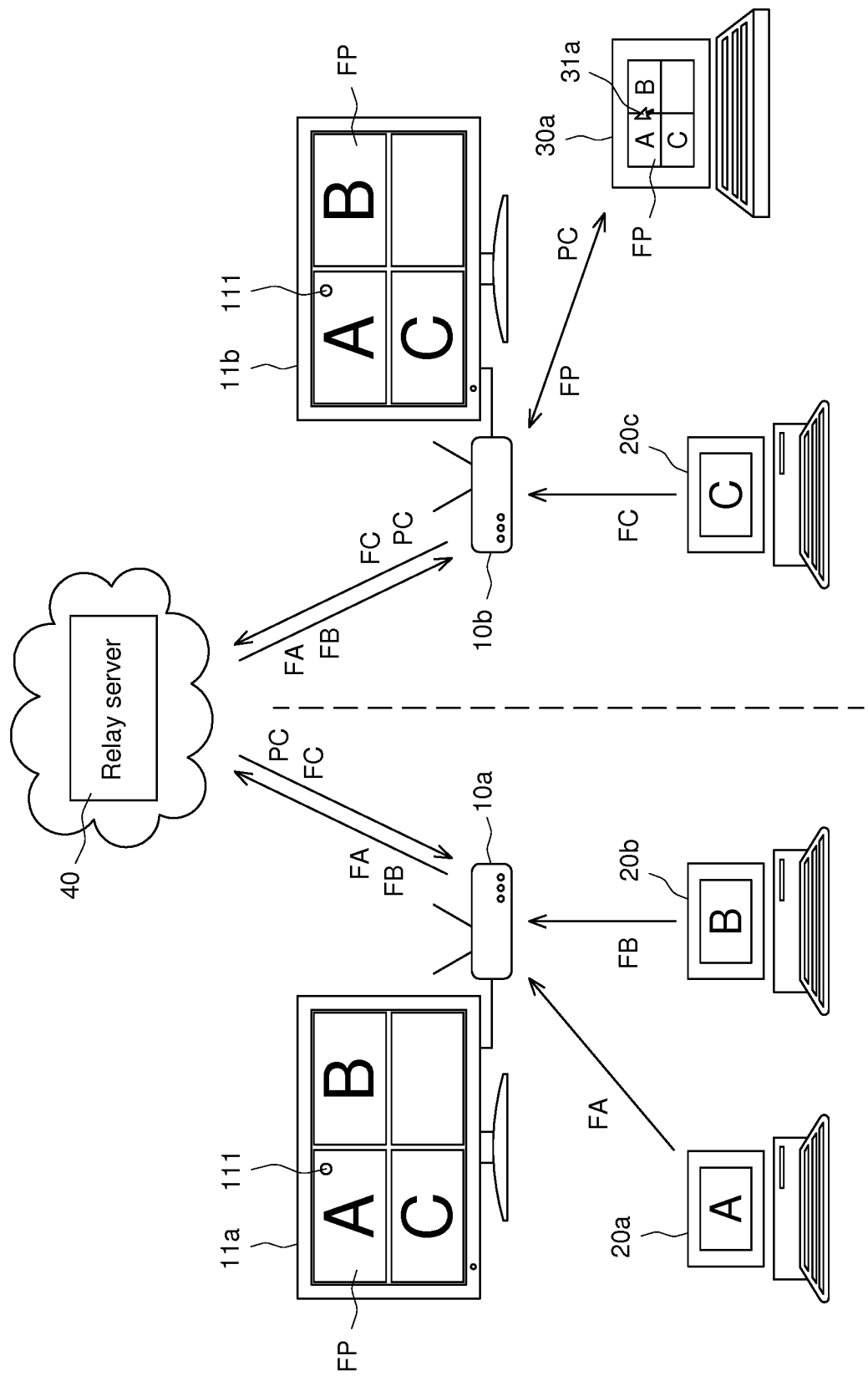
FIG. 6 is a diagram schematically showing a fourth presentation system realized by a presentation server according to one embodiment of the present invention.

Owing to the setting of firewall or network configuration, a network connection may not be established between the presentation servers 10*a* and 10*b*. Refer to FIG. 6 for the solution of the problem. In one embodiment, the presentation servers 10*a* and 10*b* exchange pointer coordinates PC and frame data FA, FB and FC through a relay server 40. In one embodiment, the relay server 40 executes a data relay method to transfer the pointer coordinates PC and the frame data FA, FB, and FC.

The data relay method comprises a step of establishing network connections between the relay server 40 and a plurality of presentation servers 10*a* and 10*b*, wherein each presentation server establishes network connections with at least one presentation device or at least one client device. For example, the presentation server 10*a* establishes network connections with the presentation devices 20a and 20b; the presentation server 10b establishes network connections with the presentation device 20c and the client device 30. It is easily understood: the presentation devices 20a and 20b transmit frame data FA and FB to the presentation server 10a; the presentation device 20c transmits the frame data FC to the presentation server 10b; the client device 30 transmits the pointer coordinates PC to the presentation server 10b. The relay server 40 receives the frame data FA, FB and FC and the pointer coordinates PC transmitted by the presentation server 10a and 10b. The relay server 40 converts the frame data FA, FB and FC into the presentation frame FP. Then, the relay server 40 transmits the presentation frame FP and the pointer coordinates PC to each of the presentation servers 10a and 10b.

It is easily understood: it is unnecessary for the relay server 40 to transmit the complete presentation frame FP. For example, the presentation server 10a has stored the frame data FA and FB transmitted by the presentation devices 20a and 20b; therefore, the relay server 40 only needs to transmit the frame data FC and the related frame configuration information to the presentation server 10a. Similarly, the presentation server 10b has stored the frame data FC transmitted by the presentation device 20c; therefore, the relay server 40 only needs to transmit the frame data FA and FB and the related frame configuration information to the presentation server 10b. In one embodiment, each presentation server has its own frame setting, such as the setting of resolution and update frequency; the relay server 40 modifies the presentation frame FP to match the frame setting and transmits the modified presentation frame FP to the corresponding presentation server. For example, the resolution of the display device 11a of the presentation server 10a is set to be merely 800×600 pixels; the relay server 40 only needs to transmit the presentation frame FP having the same resolution.

Figure 7:
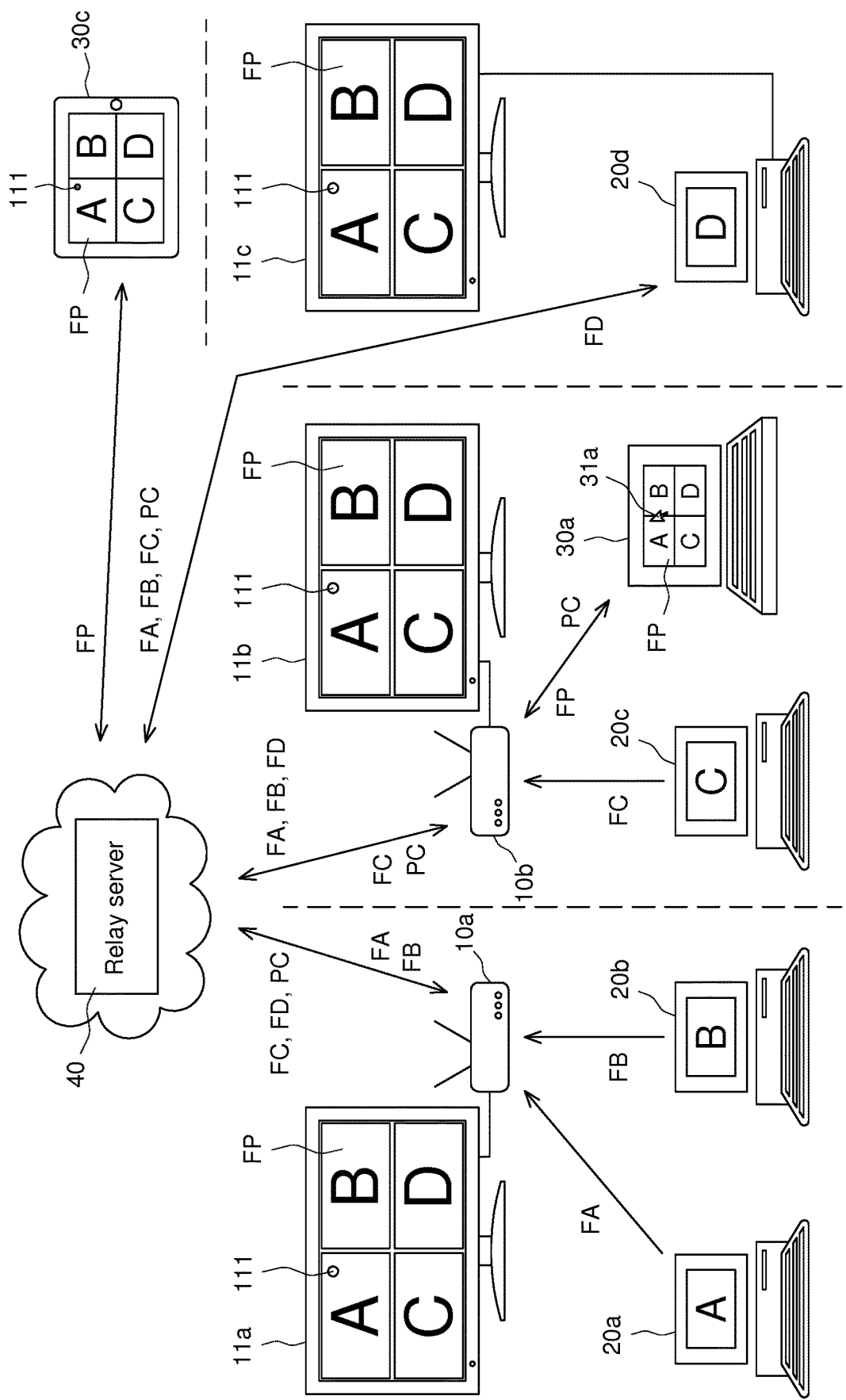
FIG. 7 is a diagram schematically showing a fifth presentation system realized by a presentation server according to one embodiment of the present invention.

Refer to FIG. 7. In one embodiment, a presentation device 20d or a client device 30c may take part in the presentation via the relay server 40. In other words, the presentation device 20d and the client device 30c may be regarded as indirectly establishing network connections with the presentation servers 10a and 10b. In one embodiment, the data relay method executed by the relay server 40 further comprises a step: displaying a virtual pointer 111 on the presentation frame FP according to the pointer coordinates PC and transmits the presentation frame FP to the client server 30c. Via the abovementioned design, the users at homes or in hotels can take part in the presentation from far ends.

It should be explained: a single electronic device can function as a presentation device and a client device simultaneously. Refer to FIG. 7 for an example. The presentation device 20d can transmit the frame data FD to the relay server 40. Besides, the presentation device 20d can also receive the presentation frame FP and thus may be regarded as a client device. As shown in FIG. 7, the presentation device 20d can use an external display device 11c to display the presentation frame FP. In one embodiment, the presentation device 20d can execute a computer program that can generate a virtual pointer. Therefore, the presentation device 20d can execute the function of a client device and is thus regraded a client device. Generally speaking, an ordinary computer executing the function of generating a virtual pointer can function as a client device. The method for generating a virtual pointer is described below. Firstly, establish a network connection between a client device and a presentation server or a relay server. It is easily understood: the presentation server or the relay server has established network connections with at least one presentation device; the presentation device transmits a frame data to the presentation server or the relay server, and the presentation server or the relay server converts the frame data into a presentation frame. Next, the client device receives the presentation frame transmitted by the presentation server or the relay server. Next, the client device retrieves pointer coordinates the user inputs into the client device. For example, the user can input pointer coordinates with a mouse, a trackball, a touchpad, a pointing stick, or a touch panel. Then, the client device transmits the pointer coordinates to the presentation server or the relay server, and the presentation server or the relay server generates a virtual pointer on the presentation frame according to the pointer coordinates.

In conclusion, the present invention proposes a presentation server, a data relay method and a method for generating a virtual pointer, which can generate a virtual pointer on the presentation contents, whereby the participant can use the client device to control the virtual pointer and thus can effectively take part in the presentation and interact with the speaker.

The invention claimed is:

1. A presentation server comprising:
   a network interface;
   a video connection port electrically connected with a display device; and
   a processor electrically connected with the network interface and the video connection port, executing a data processing method to display a presentation frame on the display device, wherein the data processing method comprises:
   respectively establishing network connections with a presentation device and a client device through the network interface;
   receiving first frame data transmitted by the presentation device;
   converting the first frame data into the presentation frame and displaying the presentation frame on the display device;
   transmitting the presentation frame to the client device;
   receiving pointer coordinates transmitted by the client device; and
   displaying a virtual pointer on the presentation frame according to the pointer coordinates.

2. The presentation server according to claim 1, wherein the virtual pointer is realized by an on-screen display (OSD) method or an overlay window method.

3. The presentation server according to claim 1, wherein the data processing method further comprises: selectively hiding the virtual pointer.

4. The presentation server according to claim 1, wherein the data processing method further comprises: displaying a track of movement of the virtual pointer according to the pointer coordinates.

5. The presentation server according to claim 1, wherein the data processing method further comprises: transmitting the pointer coordinates to the presentation device.

6. The presentation server according to claim 1, wherein the first frame data transmitted by the presentation device includes the virtual pointer.

7. The presentation server according to claim 1, wherein the processor establishes network connections with a plurality of the presentation devices, receives a plurality of the first frame data transmitted by the plurality of presentation devices, converts the plurality of first frame data into the presentation frame, and displays the presentation frame on the display device.

8. The presentation server according to claim 1, wherein the processor establishes network connections with a plurality of the client devices, receives a plurality of sets of the pointer coordinates transmitted by the plurality of client devices, and displays a plurality of the corresponding virtual pointers on the presentation frame according to the plurality of sets of pointer coordinates.

9. The presentation server according to claim 8, wherein the plurality of virtual pointers respectively has features that the users can utilize to discriminate the plurality of virtual pointers.

10. The presentation server according to claim 1, wherein the data processing method further comprises:
receiving second frame data transmitted by the another presentation server, wherein the second frame data is transmitted by a presentation device having a network connection with the another presentation server; and
converting the first frame data and the second frame data into the presentation frame and displaying the presentation frame on the display device.

11. The presentation server according to claim 1, wherein the data processing method further comprises:
establishing a network connection with another presentation server;
receiving pointer coordinates transmitted by the another presentation server, wherein the pointer coordinates is transmitted by a client device having a network connection with the another presentation server; and
displaying the virtual pointer on the presentation frame according to the pointer coordinates.

12. The presentation server according to claim 1, wherein the data processing method further comprises:
establishing a network connection with another presentation server; and
transmitting the first frame data and the pointer coordinates to the another presentation server.

13. The presentation server according to claim 12, wherein the network connection with the another presentation server is established through a relay server.

14. The presentation server according to claim 1, wherein the network connection with the presentation device or the client server is established through a relay server.

15. The presentation server according to claim 1, wherein the network connections established for the presentation device and the client device is a wireless local area network.

16. A data relay method, which is executed in a relay server to transfer frame data and pointer coordinates, comprising:
establishing network connections between the relay server and a plurality of presentation servers, wherein each of the plurality of presentation servers establishes network connections with at least one presentation device or at least one client device, and wherein the presentation device transmits the frame data to the presentation server or the client device transmits the pointer coordinates to the presentation server;
receiving the frame data and the pointer coordinates transmitted by each of the presentation servers;
converting the frame data into a presentation frame; and
transmitting the presentation frame and the pointer coordinates to each of the presentation servers.

17. The data relay method according to claim 16 further comprising:
establishing a network connection between the relay server and the client server; and
displaying a virtual pointer on the presentation frame according to the pointer coordinates and transmitting the presentation frame to the client device.

18. The data relay method according to claim 16 further comprising:
modifying the presentation frame according to frame setting of each of the presentation servers and transmitting the presentation frame to the corresponding presentation server.

19. A method for generating a virtual pointer, which is executed with a computer program in a client device, comprising:
establishing a network connection between the client device and a presentation server or a relay server, wherein the presentation server or the relay server establishes network connections with at least one presentation device, and wherein the presentation device transmits frame data to the presentation server or the relay server, and wherein the presentation server or the relay server converts the frame data into a presentation frame;
receiving the presentation frame transmitted by the presentation server or the relay server and displaying the presentation frame on a display device of the client device;
retrieving pointer coordinates that a user inputs into the client device; and
transmitting the pointer coordinates to the presentation server or the relay server to enable the presentation server or the relay server to display a virtual pointer on the presentation frame according to the pointer coordinates.

20. The method for generating a virtual pointer according to claim 19, wherein the pointer coordinates are input with a mouse, a trackball, a touchpad, a pointing stick, or a touch panel.

* * * * *